(12) United States Patent
Jung

(10) Patent No.: US 10,027,548 B2
(45) Date of Patent: Jul. 17, 2018

(54) COMMUNICATION SYSTEM AND METHOD FOR MEDIA ADAPTATION THEREIN

(75) Inventor: Kyung Hun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 12/700,410

(22) Filed: Feb. 4, 2010

(65) Prior Publication Data
US 2010/0195528 A1    Aug. 5, 2010

(30) Foreign Application Priority Data
Feb. 5, 2009  (KR) ........................ 10-2009-0009197

(51) Int. Cl.
*H04L 12/24* (2006.01)
*H04L 29/06* (2006.01)

(52) U.S. Cl.
CPC ...... *H04L 41/0853* (2013.01); *H04L 41/0233* (2013.01); *H04L 41/082* (2013.01); *H04L 65/602* (2013.01); *H04L 65/1016* (2013.01)

(58) Field of Classification Search
CPC ..... G06F 15/16; G06F 15/173; H04L 1/0009; H04L 12/26; H04L 29/02; H04L 29/06027; H04L 43/0882; H04L 1/0017; H04J 3/16; G08C 17/06
See application file for complete search history.

(56) References Cited

U.S. PATENT DOCUMENTS

| | | | | |
|---|---|---|---|---|
| 7,630,320 B2 * | 12/2009 | Zhang et al. | | 370/252 |
| 2003/0072269 A1 * | 4/2003 | Teruhi et al. | | 370/252 |
| 2006/0280205 A1 * | 12/2006 | Cho | | H04L 1/0009 370/473 |
| 2007/0030821 A1 * | 2/2007 | Iwamura et al. | | 370/328 |
| 2007/0041323 A1 * | 2/2007 | Kitahara | | H04L 43/0882 370/235 |
| 2008/0091815 A1 * | 4/2008 | Rao | | 709/223 |
| 2009/0172170 A1 * | 7/2009 | Rey | | H04L 29/06027 709/227 |
| 2010/0027450 A1 * | 2/2010 | Montojo | | H04L 1/0017 370/311 |

(Continued)

FOREIGN PATENT DOCUMENTS

JP  2006-80640 A  3/2006
KR  10-2006-0128595 A  12/2006

(Continued)

OTHER PUBLICATIONS

3GPP, Managing MTSI Adaptation, 3GPP Draft; S4-090157, Jan. 30, 2009, Sophia-Antipolis Cedex, France, XP050335457.

(Continued)

*Primary Examiner* — Andrew Lai
*Assistant Examiner* — Leon Andrews
(74) *Attorney, Agent, or Firm* — Jefferson IP Law, LLP

(57) ABSTRACT

A media adaptation method in a communication system is provided. The method includes updating a previously stored management object by a communication terminal when an operating environment of the communication terminal is changed, and determining a packet unit between the communication terminal and another communication terminal using the updated management object by the communication terminal when communicating with the other communication terminal.

16 Claims, 11 Drawing Sheets

(56) References Cited

U.S. PATENT DOCUMENTS

2010/0232297 A1* 9/2010 Johansson et al. ........... 370/241

FOREIGN PATENT DOCUMENTS

| KR | 10-2007-0037050 A | 4/2007 |
|---|---|---|
| KR | 10-2007-0075134 A | 7/2007 |
| KR | 10-2008-0065094 A | 7/2008 |
| KR | 10-0924309 B1 | 11/2009 |
| WO | 2007/022875 A1 | 3/2007 |

OTHER PUBLICATIONS

Samsung Electronics Co et al, Introduction to WID on Managing MTSI Media Adaptation, 3GPP Draft; S4-090007, Jan. 20, 2009, Sophia-Antipolis Cedex, France, vol. SA WG4, XF050638448.

Universal Mobile Telecommunications System (UMTS); IP Multimedia Subsystem (IMS); Multimedia telephony; Media handling and interaction (3GPP TS 26,114 version 7.5.0 Release .7), ERSI TS 126 114, Jul. 1, 2008, Sophia Antipolis Cedex, France, vol. 3-SA4, No. V7.5.0, XP014042134.

Samsung Electronics Co et al, Update of Media Adaptation Methods in MTSI, 3GPP Draft; S4-080610, Oct. 28, 2008, vol. SA WG4, Shenzhen, China, XP050437689.

Samsung Electronics Co et al, Work Split of 3GPP MTSINP and MTSIMA MOs, 3GPP Draft; S4-100163, CR 26114-0103 (REL. 9), Jan. 27, 2010, vol. SA WG4, St Julians, Malta, XP050638672.

\* cited by examiner

FIG. 6
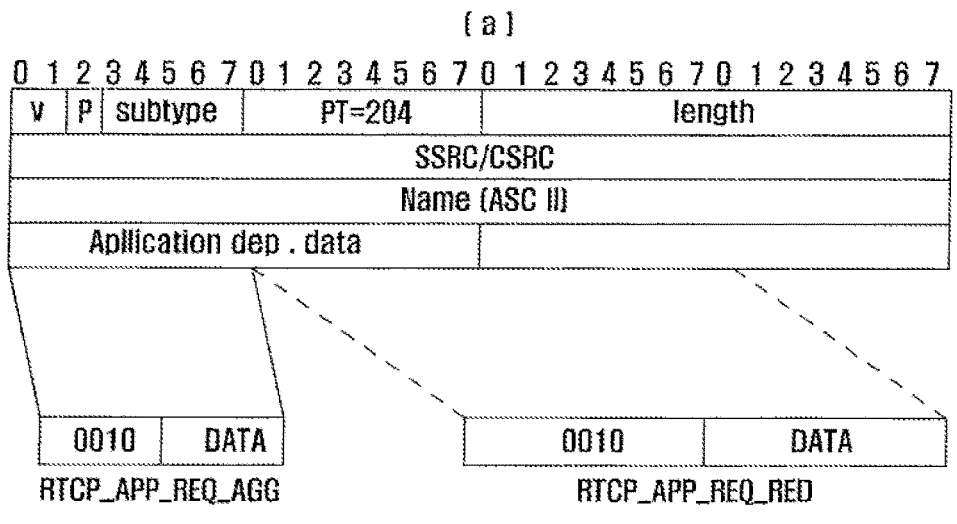
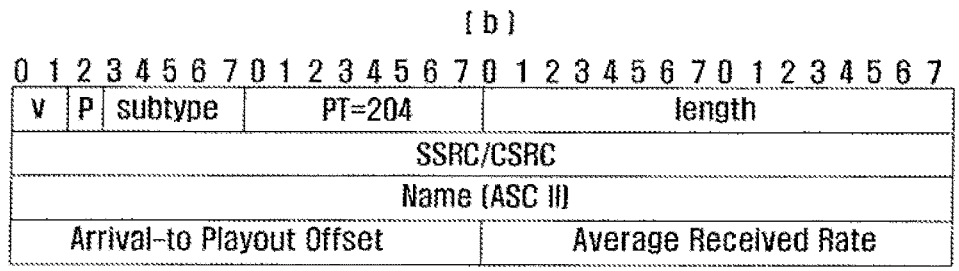
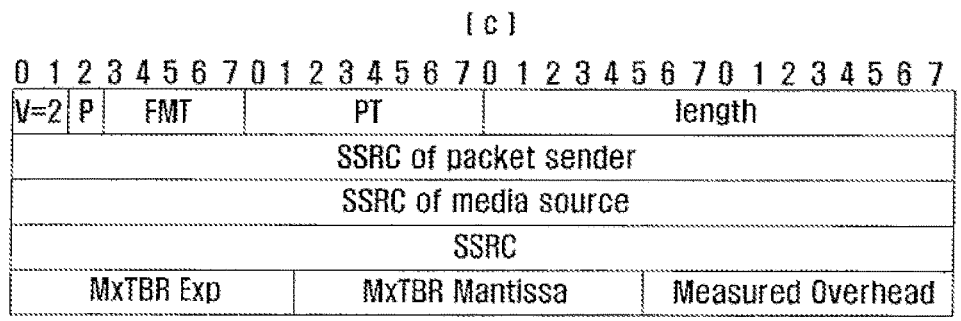

COMMUNICATION SYSTEM AND METHOD FOR MEDIA ADAPTATION THEREIN

PRIORITY

This application claims the benefit under 35 U.S.C. § 119(a) of a Korean patent application filed in the Korean Intellectual Property Office on Feb. 5, 2009 and assigned Serial No. 10-2009-0009197, the entire disclosure of which is hereby incorporated by reference.

BACKGROUND OF THE INVENTION

1. Field of the Invention

The present invention relates to a communication system and its communication method. More particularly, the present invention relates to a communication system for transmitting and receiving a multimedia packet of a communication terminal, and a media adaptation method of a communication terminal in the communication system.

2. Description of the Related Art

Generally, a communication system provides a communication service for transmitting and receiving a multimedia packet of a communication terminal. One example of such a service is a Multimedia Telephony Service for IP Multimedia Subsystem (IMS) (MTSI). Here, a multimedia packet includes a speech packet and a video packet. That is, in a communication system, a communication terminal can transmit and receive a multimedia packet through at least one radio frequency channel.

At this time, in a communication system, as the number of communication terminals increases or the state of a radio frequency channel is deteriorated, transmission of a multimedia packet between communication terminals can be delayed, or at least part of a multimedia packet can be lost. Hence, a communication terminal regulates a packet unit according to the state of a radio frequency channel, and transmits and receives a multimedia packet according to a corresponding packet unit to reduce loss of multimedia packets. This is referred to as media adaptation.

However, in such a communication system, a communication terminal performs media adaptation based on setting information recorded during the manufacturing process. Hence, it is difficult for the media adaptation to be efficiently performed because the same setting information is used in a communication terminal regardless of its operating environment. That is, it is difficult to restrain loss of multimedia packets of a communication terminal in a communication system.

SUMMARY OF THE INVENTION

An aspect of the present invention is to address at least the above-mentioned problems and/or disadvantages and to provide at least the advantages described below. Accordingly, an aspect of the present invention is to provide a communication system and a media adaptation method therein, which is capable of efficiently performing media adaptation despite a change of operating environment of a communication terminal by using a device management server to provide a management object according to the operating environment.

In accordance with an aspect of the present invention, a media adaptation method in a communication system is provided. The method includes updating a previously stored management object by a communication terminal when an operating environment of the communication terminal is changed, and determining a packet unit between the communication terminal and another communication terminal using the updated management object by the communication terminal when communicating with the other communication terminal.

Updating a previously stored management object includes determining and transmitting a management object of the communication terminal by a device management server when the operating environment of the communication terminal is changed, and updating the stored management object to the received management object by the communication terminal when receiving the determined management object.

Updating a previously stored management object can be performed when a network to which the communication terminal is connected or a cell in which the communication terminal is positioned in the network is changed, or management information including a reference value for controlling the network in the device management server is changed.

The communication terminal stores a plurality of candidate objects. Updating a previously stored management object can be performed by selecting any one of the plurality of candidate objects by the communication terminal according to the operating environment. Here, updating a previously stored management object can be performed when road information of a base station connected to the communication terminal is changed.

The management object includes at least one of a packet loss ratio, an oscillation inhibition reference value, an update period, a response restraint time to a specific request or a packet loss burst, an explicit congestion notification for a communication path, and an encoding rate.

In accordance with another aspect of the present invention, a communication terminal of a communication system is provided. The communication terminal includes a memory for storing a specific management object according to the current operating environment, a controller for updating the stored management object, and for determining a packet unit between the communication terminal and another communication terminal using the updated management object when communicating with another communication terminal, in case the operating environment is changed, and a communication unit for transmitting and receiving a multimedia packet according to the determined packet unit with the other communication terminal, under the control of the controller.

The communication system includes a management server for determining a management object of the communication terminal and notifying to the communication terminal, in case the operating environment is changed. The controller can update the stored management object with the notified management object. Here, the management server can determine a management object of the communication terminal, when a network to which the communication terminal is connected or a cell in which the communication terminal is positioned in the network is changed, or management information including a reference value for controlling the network is changed.

In an exemplary implementation, the management object includes at least one of a packet loss ratio, an oscillation inhibition reference value, an update period, a response restraint time to a specific request and a packet loss burst, an explicit congestion notification for a communication path, and an encoding rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 illustrates a data format of a command in a communication system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
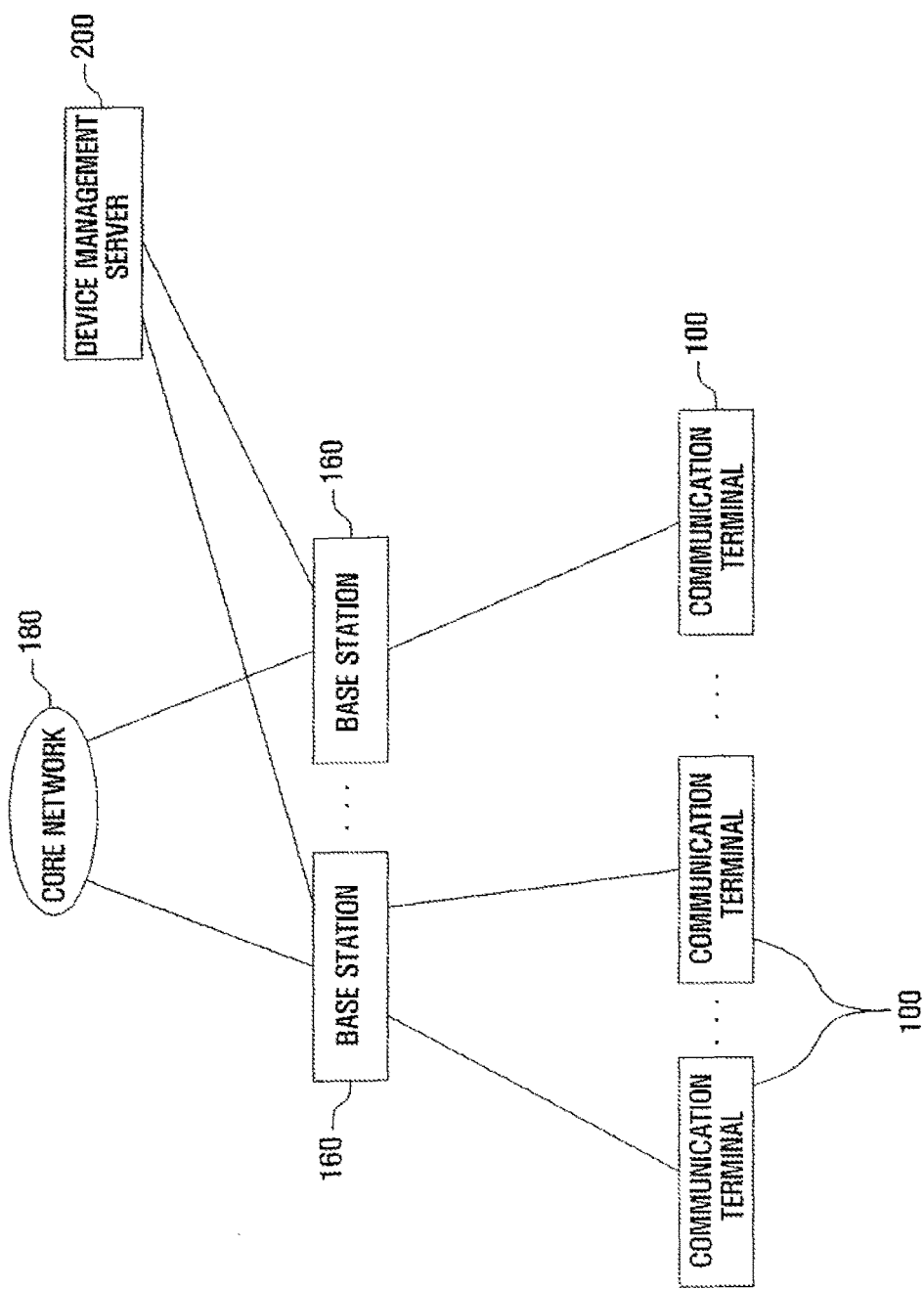
FIG. 1 illustrates a configuration of a communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the meantime, it is to be understood that the following disclosure is provided for exemplary purposes only and is not intended as a limitation of the present invention. Furthermore, all alternate embodiments which are obvious modifications of this disclosure are intended to be encompassed within the scope of the present invention.

Hereinafter, "operating environment" refers to surrounding elements for using a communication service in a communication terminal when a communication service is provided in a communication system. Such an operating environment may be called state information of a radio frequency channel. At this time, the operating environment can be changed according to a network to which a communication terminal is connected in a communication system or a cell where a communication terminal is positioned in a specific network. In addition, the operating environment can be changed by a company that operates a communication system. That is, the operating environment can be changed according to a change of a reference value for controlling a network to which a communication terminal is connected, for example, a change of management information including speech or video quality standards and communication cost standards for multimedia packets. Further, the operating environment can be changed according to a communication load of a base station to which a communication terminal is connected in a communication system, e.g., the amount of power of power amplification apparatus in a base station.

In addition, "Management Object" (MO) refers to setting information including parameters that are necessary when a communication terminal performs media adaptation in a communication system. At this time, a management object can be changed, and a communication terminal performs media adaptation using a management object. Hence, a communication terminal can perform media adaptation in various ways according to the management object. Such a management object consists of a basic setup object for transmitting and receiving a multimedia packet, e.g., a speech setup object, a video setup object and an actual adaptation object for performing media adaptation, e.g., a speech adaptation object and a video adaptation object. The basic setup object may correspond to a plurality of the actual adaptation objects and may be combined with one of the actual adaptation objects. Here, the basic setup object includes a coding scheme and a bandwidth. The actual adaptation object includes at least one of a Packet Loss Ratio (PLR_i), an oscillation inhibition reference value (N_INHIBIT), an update period (N_HOLD), a response restraint time to a specific request (T_RESPONSE), a packet loss burst, an Explicit Congestion Notification (ECN) for a communication path and an encoding rate.

Hereinafter, "packet unit" refers to restraint information defined in advance in order to transmit and receive a multimedia packet between communication terminals in a communication system. At this time, a packet unit is determined according to operating environment through media adaptation in a communication terminal. Here, a packet unit includes at least one of the actual generation size of a multimedia packet and the generation frequency of a multimedia packet, that is, the bit rate of a multimedia packet. That is, in a communication system, a communication terminal transmits and receives a multimedia packet according to a corresponding packet unit.

FIG. 1 illustrates a configuration of a communication system according to an exemplary embodiment of the present invention.

Referring to FIG. 1, a communication system includes a communication terminal 100, a base station 160, a core network 180 and a Device Management (DM) server 200.

A communication terminal 100 is a device for using a communication terminal, and has mobility. Such a communication terminal 100 can transmit and receive a multimedia packet through at least one radio frequency channel. At this time, the communication terminal stores a specific management object, and performs media adaptation using the management object before transmitting and receiving a multimedia packet. That is, the communication terminal 100 determines a packet unit that is suitable for an operating environment. In addition, the communication terminal 100 transmits and receives a multimedia packet according to the packet unit. Here, the communication terminal 100 can update the management object according to the exemplary embodiment of the present invention.

A base station 160 controls each service area in a specific network, and performs communication with a communication terminal 100 of a corresponding service area. Such a base station 160 can perform communication with another base station 160, and can relay communication between a communication terminal of the corresponding service area and a communication terminal 100 of another service area. That is, the base station 160 can relay transmission and reception of a multimedia packet between communication terminals 100.

A core network 180 connects networks. Such a core network 180 can perform communication with base stations 160 of a specific network, and can relay communication between communication terminals 100 of a corresponding network. In addition, a core network 180 can relay communication between a base station 160 of a specific network and a base station 160 of another network. That is, a core network 180 can relay transmission and reception of a multimedia packet between communication terminals 100.

A device management server 200 provides a management object for updating in a communication terminal 100 according to an exemplary embodiment of the present invention. Such a device management server 200 determines a management object according to the operating environment of a communication terminal 100 and notifies the management object when the operating environment of a communication terminal 100 is changed. At this time, the device management server 200 can recognize a change of operating environment of a communication terminal 100 by occasionally or periodically recognizing and analyzing the operating environment of a communication terminal 100. Here, the device management server 200 can recognize the operating environment of a communication terminal 100 through a location server (not shown), such as a Mobility Management Entity (MME) which manages mobility of a communication terminal 100. That is, the device management server 200 can recognize a handover or roaming of a communication terminal 100 or a change of a network by a company that operates a communication system. In addition, the device management server 200 can recognize a change of the operating environment of a communication terminal 100 when management information is changed by a company that operates a communication system.

Hereafter, a configuration of an interface for transmitting and receiving a multimedia packet in a communication system will be explained.

Figure 2:
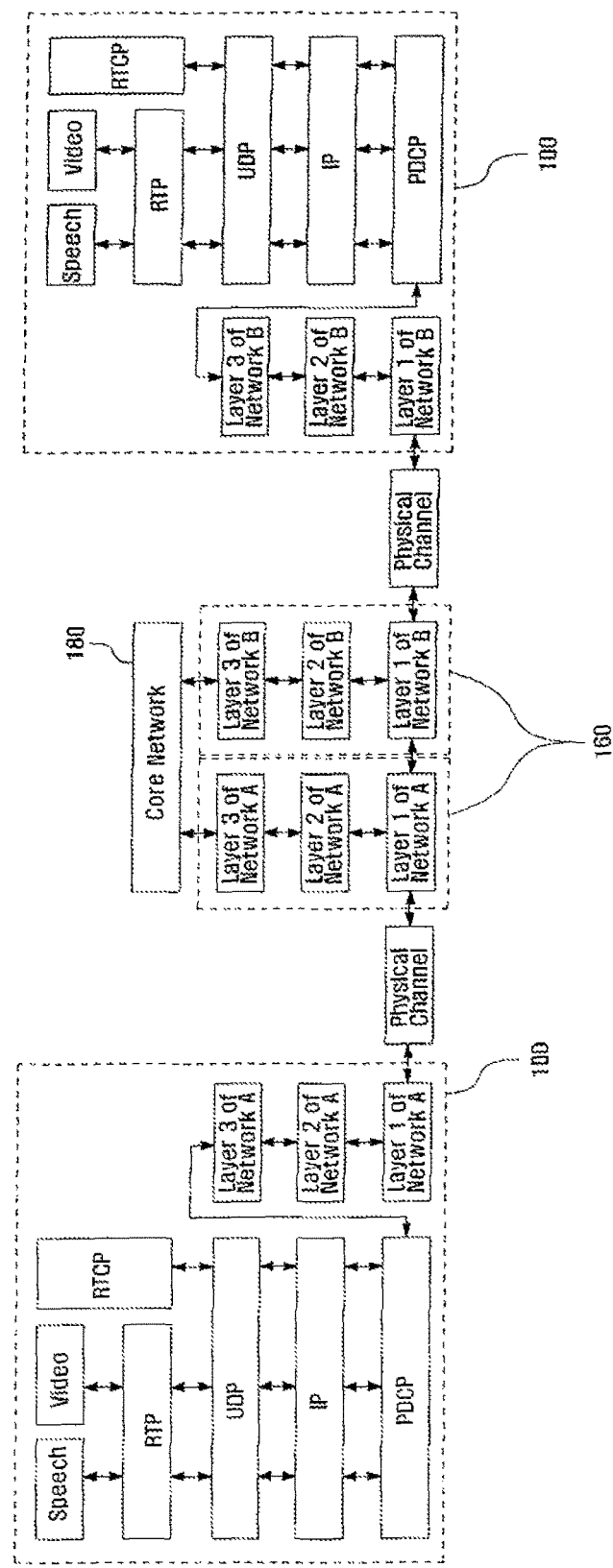
FIG. 2 illustrates a configuration of an interface in a communication system according to an exemplary embodiment of the present invention.

FIG. 2 illustrates a configuration of an interface in a communication system according to an exemplary embodiment of the present invention.

Referring to FIG. 2, a communication terminal 100 compresses speech data and video data respectively, and then, divides the compressed data in a packet unit and generates a multimedia packet. In addition, a communication terminal 100 sequentially attaches a Routing Table Protocol (RTP), RTP Control Protocol (RTCP), User Datagram Protocol (UDP) and Internet Protocol (IP) header to a multimedia packet, and sequentially attaches a layer 3, layer 2 and layer 1 header of a corresponding network, for example, network A, through Packet Data Convergence Protocol (PDCP). In addition, a communication terminal 100 transmits a multimedia packet to a base station 160 through a physical channel. When receiving a multimedia packet through the physical channel, the base station sequentially removes the layer 1, layer 2 and layer 3 header from the multimedia packet. In addition, the base station 160 transmits a multimedia packet to another base station through a core network 180.

Further, when receiving a multimedia packet through a core network 180, a base station 160 sequentially attaches the layer 3, layer 2 and layer 1 header of a corresponding network, for example, network B, to the multimedia packet. In addition, the base station 160 transmits a multimedia packet to another communication terminal 160 through a physical channel. When receiving a multimedia packet through a physical channel, the communication terminal 100 sequentially removes the layer 1, layer 2 and layer 3 header from the multimedia packet, and sequentially removes the IP, UDP, RTCP and RTP header through PDCP. Additionally, the communication terminal 100 processes a multimedia packet as speech data and video data.

Figure 3:
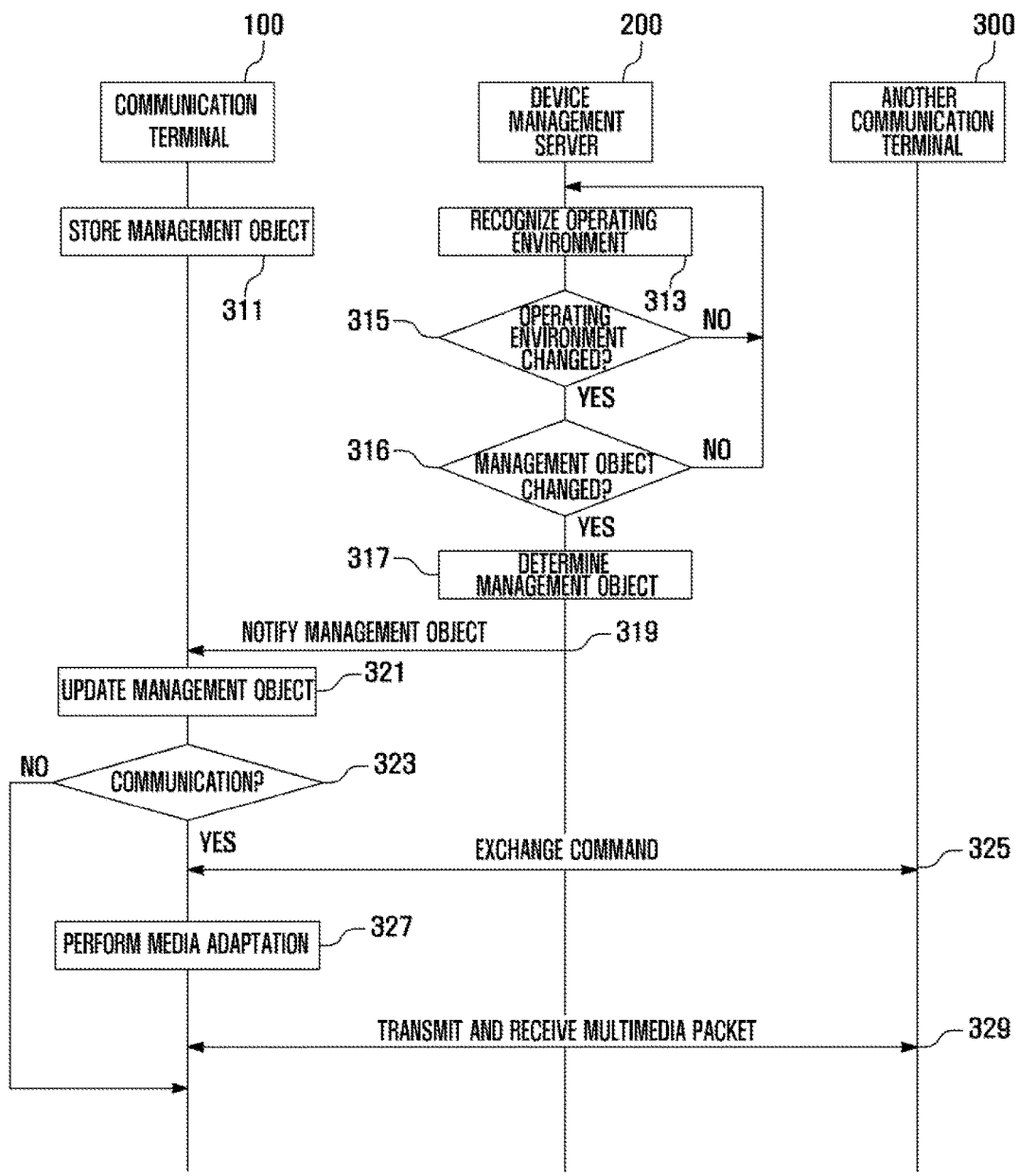
FIG. 3 illustrates a signal flow when media adaptation procedure is performed in a communication system according to an exemplary embodiment of the present invention.

FIG. 3 illustrates a signal flow when media adaptation procedure is performed in a communication system according to an exemplary embodiment of the present invention.

Referring to FIG. 3, a media adaptation procedure according to an exemplary embodiment of the present invention starts with the process that a communication terminal 100 stores a management object in step 311. At this time, a communication terminal 100 may store a management object according to the setting in the manufacturing process.

In addition, the communication terminal 100 and a device management server 200 can store candidate objects for updating as management object. Here, each candidate object can have a unique identifying ID. Moreover, the communication terminal 100 can store at least some of candidate objects of the device management server 200.

In addition, a device management server 200 recognizes operating environment of a communication terminal 100 in step 313. At this time, the device management server 200 may occasionally collect information on the operating environment of the communication terminal 100, or can periodically collect the information of the operating environment. Here, the device management server 200 recognizes a network to which the communication terminal 100 is connected and a cell where the communication terminal 100 is positioned. In addition, the device management server 200 recognizes management information of a corresponding communication system. Thereafter, the device management server 200 determines whether the operating environment of a communication terminal 100 is changed in step 315. At this time, a network to which a communication terminal 100 is connected or a cell where a communication terminal 100 is positioned can be changed according to a handover or roaming of a communication terminal 100 or a network change by a company that operates a communication system. Additionally, management information can be changed by a company that operates the communication system.

Next, if it is determined at step 315 that the operating environment of a communication terminal 100 is changed, the device management server 200 determines whether it is necessary to change the management object according to the communication terminal 100 in step 317. That is, the device management server 200 determines whether the management object which is suitable to the current operation environment is stored in the communication terminal 100. At this time, if it is determined at step 316 that the change of management object is necessary as the management object which is not suitable to the current operation environment is stored in the communication terminal 100, a device management server 200 determines a management object according to the operating environment of a communication terminal 100 in step 317. In addition, the device management server 200 notifies the management object to the communication terminal 100 in step 319.

At this time, the device management server 200 determines whether a corresponding management object is stored in the communication terminal 100 as a candidate object. In addition, if management object is stored in the communication terminal 100, the device management server 200 transmits the identifying ID of corresponding management object to the communication terminal 100. Alternatively, if management object is not stored in the communication terminal 100, the device management server 200 directly transmits the corresponding management object to the communication terminal 100. Thereafter, when the management object is notified, the communication terminal 100 updates the management object in step 321. At this time, if a specific management object is received, the communication terminal 100 sets a corresponding management object and stores the management object as a candidate object as well. Alternatively, if a specific identifying ID is received, the communication terminal 100 can select one of candidate objects using identifying ID, and can set the selected object as the management object.

In the meantime, though not illustrated, if the corresponding management object is not stored as a candidate object in the communication terminal 100 as well as in the device management server 200, the device management server 200 can notify this to the communication terminal 100 with a warning sign "Invalid Media Adaption". If the warning sign is received, the communication terminal 100 can be set to be unable to communicate with another communication terminal 300.

Next, the communication terminal 100 determines whether there is a communication with another communication terminal 300 at step 323. If it is determined in step 323 that there is a communication with another communication terminal 300, the communication terminal 100 exchanges a command with the other communication terminal 300 in step 325. When receiving the command, the communication terminal 100 performs media adaptation using the management object in step 327. At this time, the communication terminal 100 determines a packet unit between a communication terminal 100 and the other communication terminal 300 according to the operating environment. Thereafter, the communication terminal 100 transmits and receives a multimedia packet with the other communication terminal 300 according to the packet unit in step 329.

Hereinafter, a configuration of such a communication system and media adaptation procedure therein will be explained in more detail.

Figure 4:
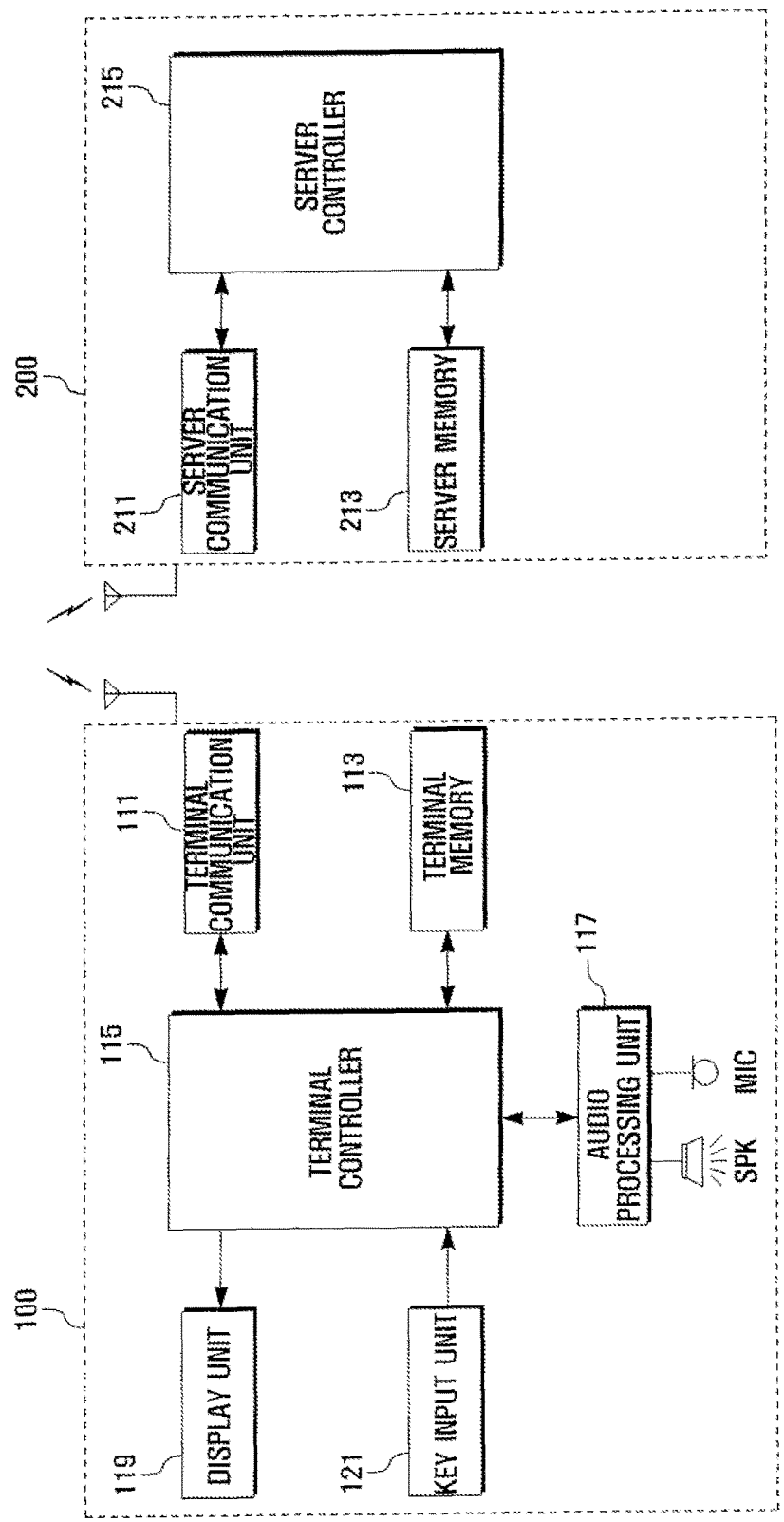
FIG. 4 illustrates an internal configuration of a communication terminal and a device management server in a communication system according to an exemplary embodiment of the present invention.

FIG. 4 illustrates an internal configuration of a communication terminal and a device management server in a communication system according to an exemplary embodiment of the present invention. At this time, it is assumed that a communication terminal is a mobile phone.

Referring to FIG. 4, a communication terminal 100 includes a terminal communication unit 111, a terminal memory 113, a terminal controller 115, an audio processing unit 117, a display unit 119 and a key input unit 121.

The terminal communication unit 111 performs communication functions of a communication terminal 100. Such a terminal communication unit 111 includes a transmitter which up-converts and amplifies a frequency of a transmitted signal, and a receiver which low-noise amplifies a received signal and down-converts a frequency.

The terminal memory 113 may include a program memory and a data memory. The program memory stores programs for controlling overall operations of a communication terminal 100. At this time, the program memory stores programs for updating a management object and performing media adaptation according to the management object according to an exemplary embodiment of the present invention. The data memory stores data generated while programs are performed. Here, the data memory can store speech data and video data. Such a terminal memory 113 stores a management object according to an exemplary embodiment of the present invention. In addition, the terminal memory 113 stores candidate objects for updating into the management object. Here, each candidate object can include its unique identifying ID.

The terminal controller 115 controls overall operations of a communication terminal 100. At this time, the terminal controller 115 includes a data processing unit having a transmitter which encodes and modulates a transmitted signal and a receiver which demodulates and decodes a received signal. Here, the data processing unit may include a modem and a codec. In addition, the codec may include a data codec which processes packet data or the like and an audio codec which processes an audio signal such as a voice. Such a terminal controller 115 updates a management object of a terminal memory 113 if a management object is notified through a terminal communication unit 111 according to an exemplary embodiment of the present invention. In addition, a terminal controller 115 performs media adaptation using a management object. At this time, the terminal controller 115 determines a packet unit. In addition, the terminal controller 115 generates a multimedia packet including speech data and video data of a terminal memory 113 according to the packet unit. Moreover, the terminal controller 115 controls to transmit and receive a multimedia packet through a terminal communication unit 111. At this time, the terminal controller 115 can play speech data and video data of the multimedia packet.

The audio processing unit 117 plays reception speech data outputted from the audio codec of a data processing unit through a speaker (SPK), or transmits transmission speech data generated from a microphone (MIC) to the audio codec of the data processing unit.

The display unit 119 displays video data outputted from a terminal control unit 115. Such a display unit 119 can use a Liquid Crystal Display (LCD), and in such a case, the display unit 119 can include an LCD controller, a memory that can store video data, and an LCD display device or the like. At this time, if the LCD is implemented with a touch screen type, it can be operated as an input unit.

The key input unit 121 includes keys for inputting number and character information and functions keys for setting various functions.

In an exemplary implementation, the device management server 200 includes a server communication unit 211, a server memory 213 and a server controller 215.

The server communication unit 211 performs a communication function of the device management server 200. Such a server communication unit 211 includes a transmitter which up-converts and amplifies the frequency of a transmitted signal and a receiver which low-noise amplifies a received signal and down-converts the frequency.

The server memory 213 may include a program memory and a data memory. The program memory stores programs for storing overall operations of a management server 200. At this time, the program memory stores programs for managing a management object for each communication terminal 100 according to an exemplary embodiment of the present invention. The data memory stores data generated while programs are performed. Such a server memory 213 stores a management object for each communication terminal 100 according to an exemplary embodiment of the present invention. In addition, the server memory 213 stores candidate objects for updating a management object of a communication terminal 100 according to an exemplary embodiment of the present invention. Here, each candidate object can include its unique identifying ID. At this time, the server memory 213 can store candidate objects corresponding to each operating environment where a communication terminal 100 can exist, for example, to each network or each cell, or can store candidate objects corresponding to each company that operates a communication system. That is, the server memory 213 can store one of the candidate objects as a management object of the communication terminal 100.

The server controller 215 controls overall operations of a device management server 200. At this time, the server controller 215 includes a data processing unit having a transmitter which encodes and modulates a transmitted signal and a receiver which demodulates and decodes a received signal. Here, the data processing unit can include a modem and a codec. Such a server controller 215 determines whether the operating environment is changed for each communication terminal 100 according to an exemplary embodiment of the present invention. At this time, the server controller 215 can determine whether the operating environment is changed for each communication terminal 100 by occasionally or periodically recognizing and analyzing the operating environment for each communication terminal 100. Here, the server controller 215 can collect information on the operating environment for each communication terminal 100 from a location server like a mobility management entity or can collect management information registered and changed by a company that operates a communication system, so that the server controller 215 can use the collected information to determine whether operating environment is changed for each communication terminal 100. In addition, the server controller 215 controls to determine a management object according to the operating environment of a communication terminal 100 from candidate objects of the server memory 213, and to notify the communication terminal 100 of the determination through the server communication unit 211. At this time, the server controller 215 updates the management object for each communication terminal 100 in the server memory 215.

Figure 5:
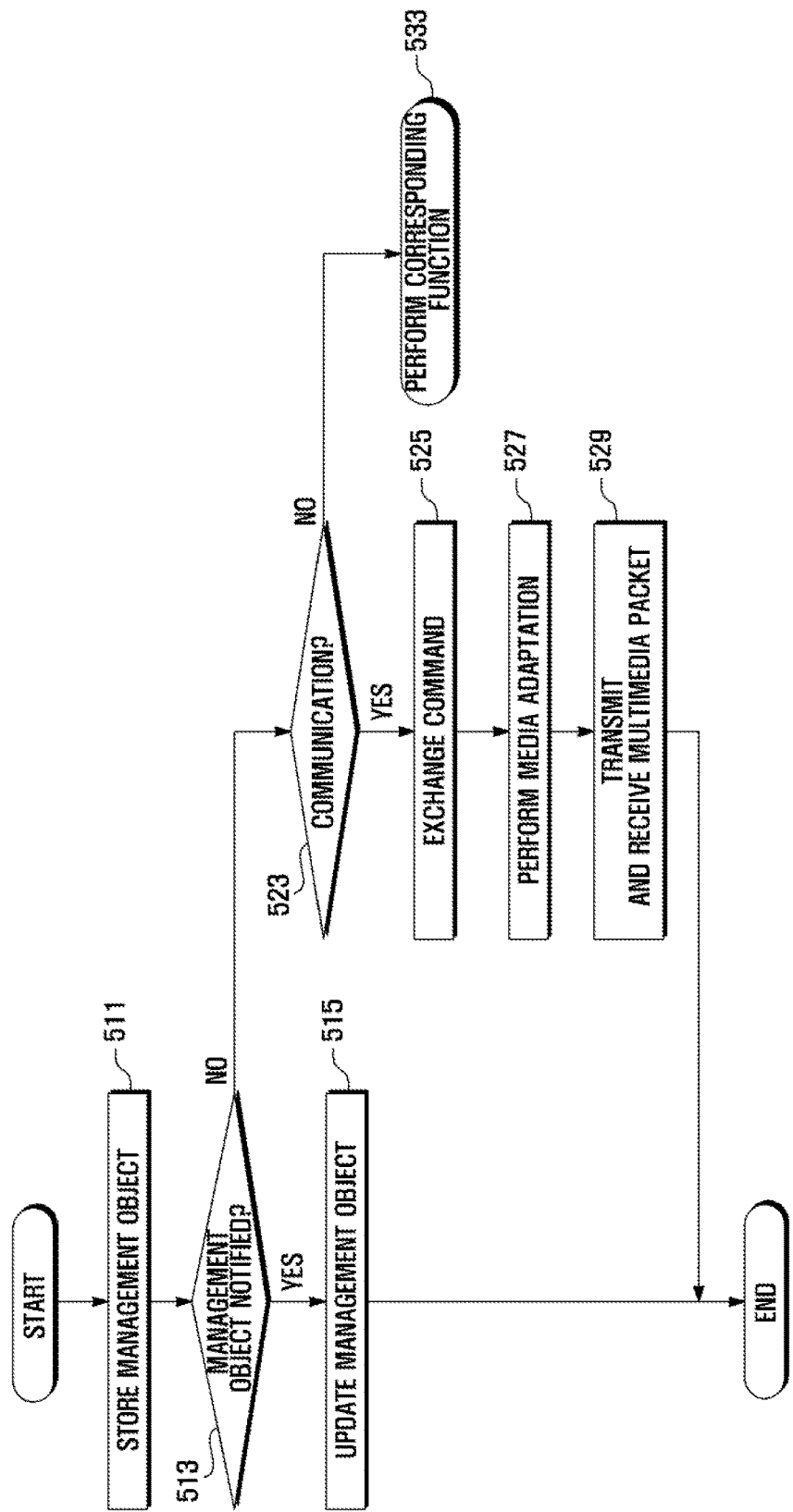
FIG. 5 illustrates an operating procedure of a communication terminal in a communication system according to an exemplary embodiment of the present invention.
Figure 7:
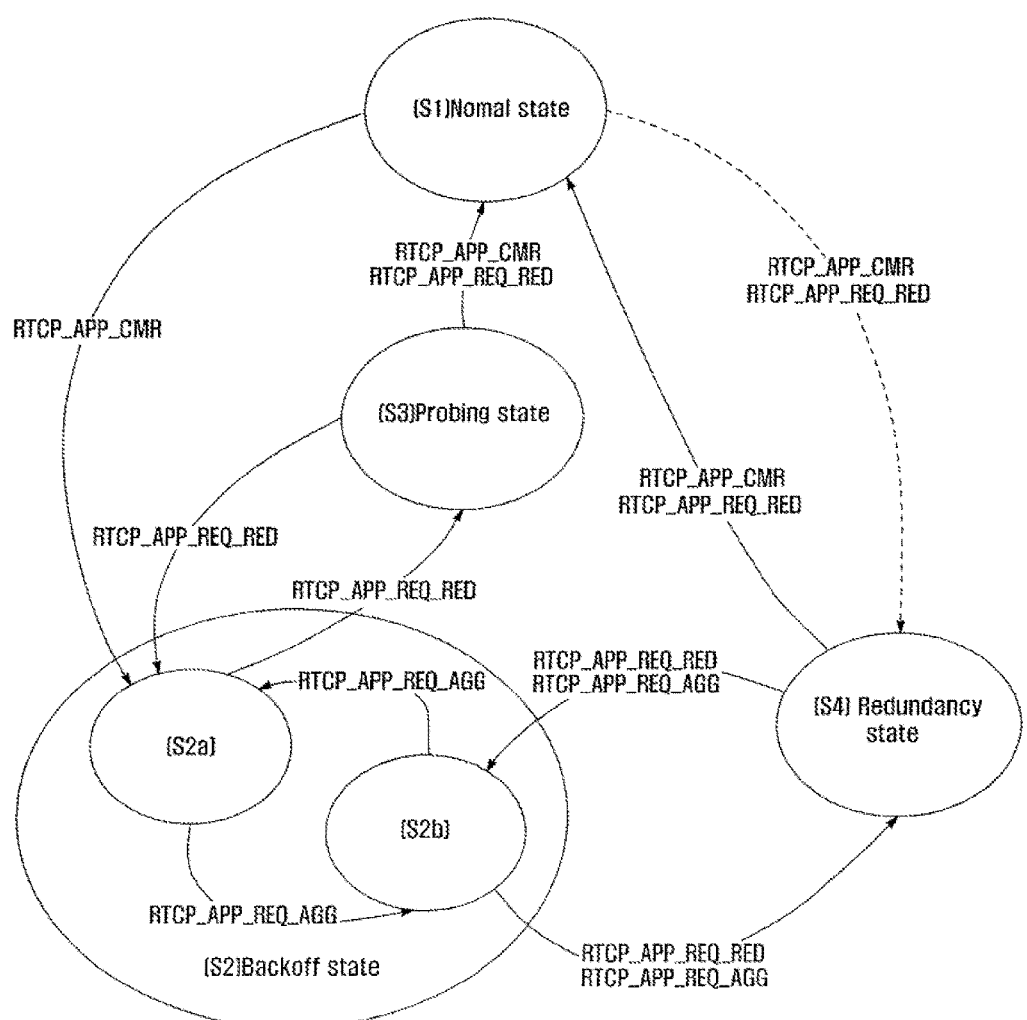
FIG. 7 illustrates state transitions in media adaptation in a communication system according to an exemplary embodiment of the present invention.

FIG. 5 illustrates an operating procedure of a communication terminal in a communication system according to an exemplary embodiment of the present invention. FIG. 6 illustrates a data format of a command in a communication system according to an exemplary embodiment of the present invention. FIG. 7 illustrates state transitions in media adaptation in a communication system according to an exemplary embodiment of the present invention.

Referring to FIG. 5, an operating procedure of a communication terminal starts with a process that a terminal controller stores a management object in a terminal memory 113 in step 511. At this time, the terminal memory 113 stores candidate objects. Here, each candidate object can include its unique identifying ID. Thereafter, the terminal controller determines whether the management object is notified through a terminal communication unit in step 513. If it is determined in step 513 that the management object is received through the terminal communication unit, the terminal controller updates the management object of a terminal memory in step 515. At this time, if a management object is received, the terminal controller 115 not only updates the management object of the terminal memory 113, but also stores the management object as a candidate object in the terminal memory 113. In addition, if an identifying ID is received, the terminal controller 115 selects a candidate object corresponding to the identifying ID from the terminal memory 113, and updates the selected candidate object as a management object. Here, the management object can be configured as shown in the following Table 1.

TABLE 1

| Parameter | Value/meaning | Comment |
|---|---|---|
| PLR_1 | 3% | |
| RLR_2 | 1% | |
| RLR_3 | 2% | |
| RLR_4 | 10% | |
| N_INHIBIT | 1000 frames | A random value may be used to avoid large scale oscillation problems. |
| N_HOLD | 5 measurement periods | |
| T_RESPONSE | 200 ms | Estimated response time for a request to be fulfilled. |
| Packet Loss Burst | 2 or more packet losses in the last 20 packets | |
| — | — | |
| — | — | |
| — | — | |

In contrast, if it is determined in step 513 that the management object is not notified through the terminal communication unit, the terminal controller determines whether there is a communication with another communication terminal at step 523. If it is determined in step 523 that there is a communication with another communication terminal, the terminal controller exchanges a command as illustrated in FIG. 6 with the other communication terminal 300 in step 525. At this time, the terminal controller can exchange a command for speech data for controlling to determine a packet unit for speech data, that is, RTCP-APP command as shown in (a) of FIG. 6, with another communication terminal. In addition, the terminal controller can mutually exchange a command for video data for controlling to determine a packet data for video data, that is, APTO_ARR PTCP APP command as shown in (b) of FIG.

6 or TMMBR command as shown in (c) of FIG. 6, with another communication terminal.

Next, the terminal controller performs media adaptation using a management object of a terminal memory 113 in step 527. At this time, the terminal controller determines a packet unit for transmission. For example, when receiving an RTCP-APP command, the terminal controller can determine the generation size and generation frequency of a multimedia packet by performing media adaptation as illustrated in FIG. 7. Likewise, when receiving APTO_ARR RTCP APP command or TMMBR command, the terminal controller can determine the generation size and generation frequency of a multimedia packet by performing media adaptation.

That is, the terminal controller can recognize the current state, and can perform media adaptation through state transition according to RTCP_APP_REQ_RED data, RTCP_APP_REQ_AGG data, RTCP_APP_CMR data, and the like of RTCP-APP command. In other words, the terminal controller 115 can regulate the redundancy level and the offset level according to RTCP_APP_REQ_RED data, can regulate the generation frequency of speech data according to RTCP_APP_REQ_AGG data, and can regulate the bit rate according to RTCP_APP_CMR data. Here, the state of the terminal controller can be one of S1, S2, S3 and S4, and examples of S1, S2, S3 and S4 are shown in Table 2. In addition, the state transition of the terminal controller is shown in Table 3.

TABLE 2

| State | Description |
|---|---|
| S1 | Default/normal state: Good channel conditions. |
| S2 | In this state the encoding bit-rate and the packet rate is reduced. The state is divided into 2 sub states (S2a and S2b). In state S2a the codec rate is reduced and in state S2b the packet rate is also reduced (the frame aggregation is increased). State S2a may also involve a gradual decrease of the codec-rate in order to be in agreement with the session parameters. If no restrictions are in place regarding mode changes (i.e. such as only allowing changing to a neighboring mode), it changes bit-rate to the target reduced bit-rate directly. If restrictions are in place, several mode changes might be needed. |
| S3 | This is an interim state where the total bit-rate and packet rate is roughly equal to state S1. 100% redundancy is used with a lower codec mode than S1. This is done to probe the channel band-width with a higher tolerance to packet loss to determine if it is possible to revert back to S1 without significantly increasing the packet loss rate. |
| S4 | In this state the encoding bit-rate is reduced (the same bit-rate as in S2) and redundancy is turned on. Optionally the packet rate is kept the same as in state S2. |

TABLE 3

| State transition | Description |
|---|---|
| S1→S2a | Condition: Packet loss ≥PLR_1 or packet loss burst detected. A request to reduce the encoding bit-rate is sent using RTCP_APP_CMR, e.g. change mode from AMR 12.2 to AMR 5.9. A failed transition counter counts the number of consecutive switching attempts S2a→S1 that fails. If the number of failed attempts is two or more state S1 is inhibited for N_INHIBIT frames. |
| S2a→S2b | Condition: Packet loss ≥PLR_1. This state transition occurs if the packet loss is still high despite the reduction in codec rate. A request is sent to reduce the packet rate is reduced by means of an RTCP_APP_REQ_AGG message. |
| S2b→S2a | Condition: Packet loss ≤PLR_2 for N_HOLD consecutive measurement periods. This state transition involves an increase of the packet rate restoring it to the same value as in S1. The request transmitted is RTCP_APP_REQ_AGG. If the state transition S2b→S2a→S2b occurs in sequence, the state will be locked to S2b for N_INHIBIT frames to avoid state oscillation. |
| S2a→S1 | Condition: Packet loss ≤PLR_2 for N HOLD consecutive measurement periods. Redundancy is turned on (100%) by means of request RTCP_APP_REZ_RED. |

Next, the terminal controller transmits and receives a multimedia packet according to the packet unit in step 529. At this time, the terminal controller generates a multimedia packet with speech data and video data of a terminal memory according to the packet unit, and transmits the generated multimedia packet. In addition, when the multimedia packet is received, the terminal controller can play speech data and video data of the multimedia packet through an audio processing unit and a display unit.

In the meantime, if the management object is notified through the terminal communication unit 111 or communication with another communication terminal 300 is not performed, the terminal controller 115 can perform a corresponding function in step 533. For example, if a warning message like "Invalid Media Adaptation" is received through the terminal communication unit 111, it can be set that the terminal controller 115 cannot communicate with another communication terminal 300. In addition, the terminal controller 115 can output a notice message to notify that the speech quality is low through the display unit 119 or the audio processing unit 117, and may not allow communication with another communication terminal 300. In addition, the terminal controller 115 can wait until another management object is notified.

Figure 8:
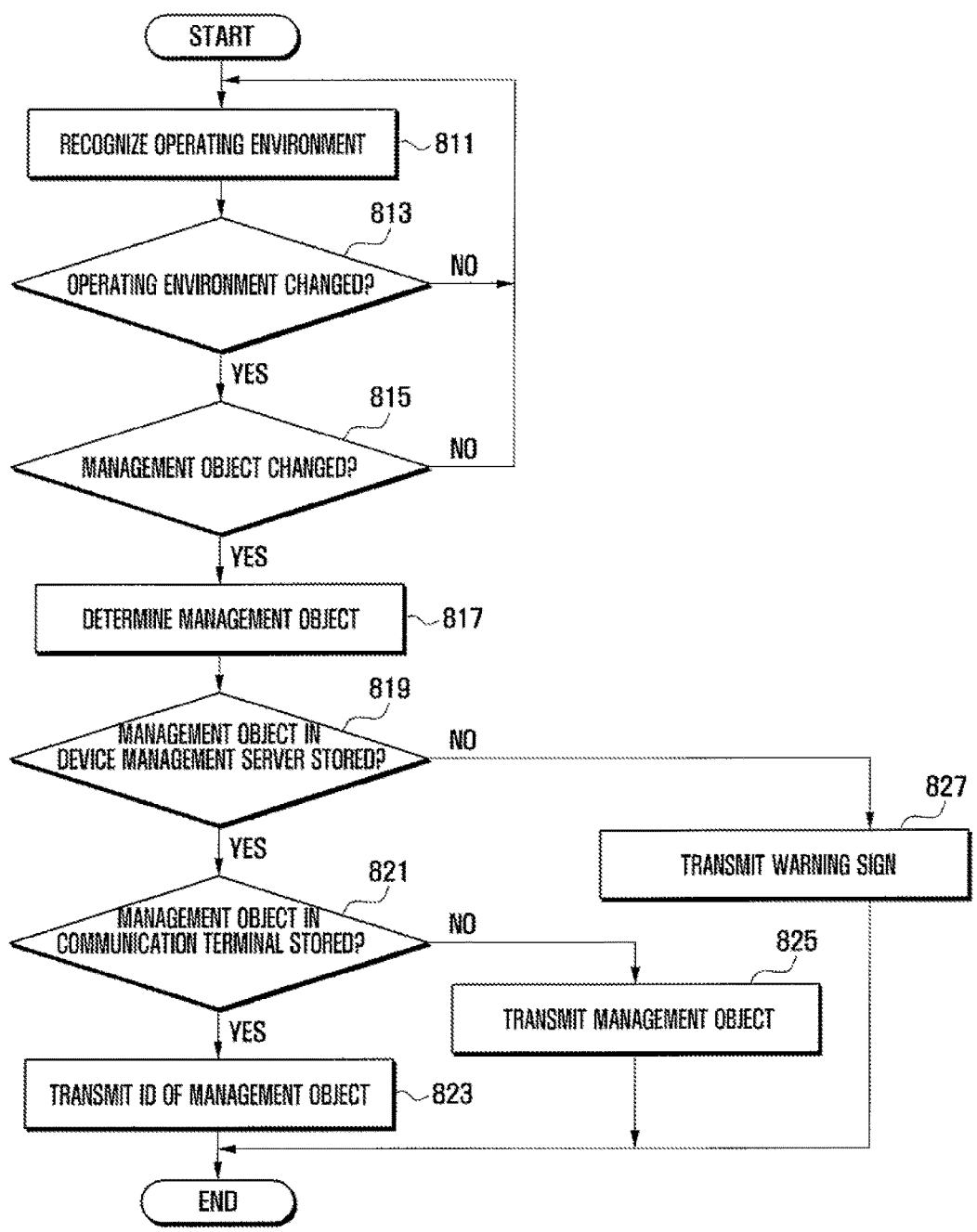
FIG. 8 illustrates an operating procedure of a device management server in a communication system according to an exemplary embodiment of the present invention.
Figure 9:
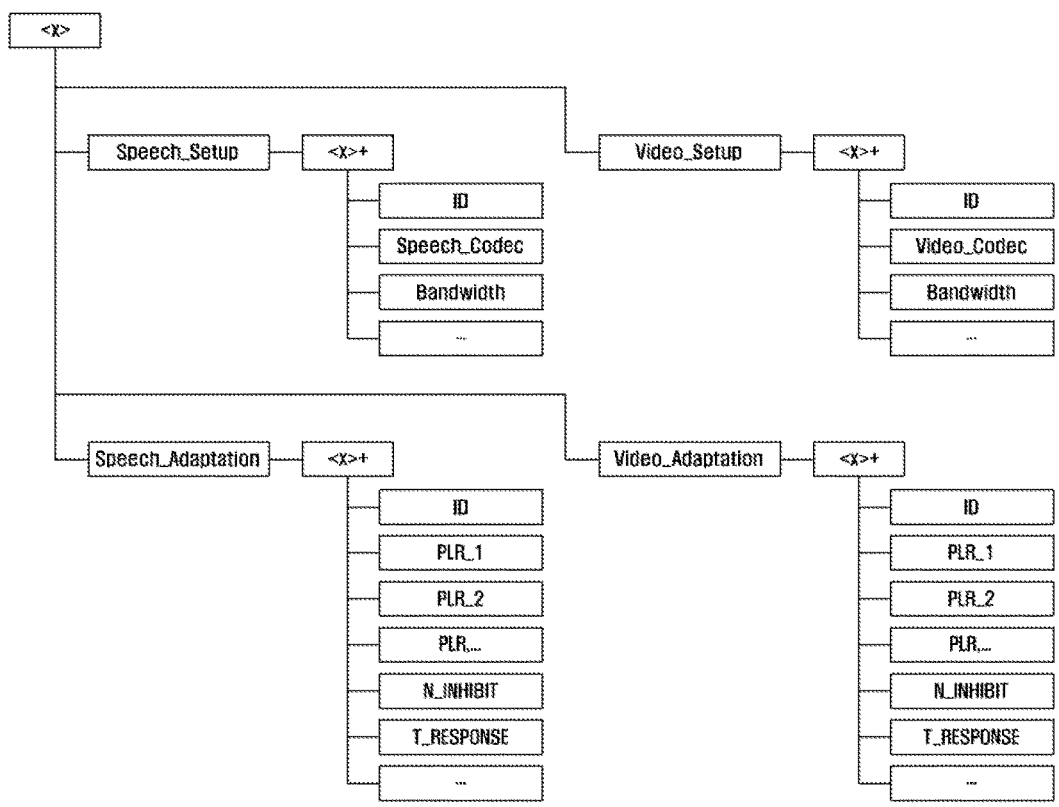
FIG. 9 illustrates a structure of a management object in a communication system according to an exemplary embodiment of the present invention.

FIG. 8 illustrates an operating procedure of a device management server in a communication system according to an exemplary embodiment of the present invention. FIG. 9 illustrates a structure of a management object in a communication system according to an exemplary embodiment of the present invention.

Referring to FIG. 8, an operating procedure of a management server in a communication system starts with the process that a server controller collects and recognizes the operating environment for each communication terminal in step 811. At this time, a server memory 213 stores in advance candidate objects corresponding to each operating environment, for example, each network or each cell, where the communication terminal can exist, or corresponding to each company that operates a communication system. Here, each candidate object can include its unique identifying ID. Thereafter, the server controller determines whether the operating environment of a communication terminal is changed in step 813. At this time, the server controller can recognize whether the operating environment of a communication terminal is changed, by occasionally or periodically recognizing and analyzing the operating environment of a communication terminal. Here, the server controller can determine whether the operating environment is changed for each communication terminal, by collecting information on the operating environment for each communication terminal from a location server, such as a mobility management entity, or by collecting management information registered and changed by a company that operates a communication system. For example, the server controller can recognize a handover or roaming of a communication terminal or a network change by a company that operates a communication system. In addition, the server controller can recognize registration and change of management information by a company that operates a communication system.

Next, if it is determined at step 813 that the operating environment of a communication terminal is changed, the server controller 215 determines whether it is necessary to change the management object according to the communication terminal 100 in step 815. That is, the server controller 215 determines whether a management object which is suitable to the current operating environment is stored in the communication terminal 100. At this time, if it is determined that a management object which is not suitable to the current operating environment is stored in step 815, and thus a change of the management object is necessary, the server controller 215 determines a management object according to the operating environment of a communication terminal 100 in the form of nodes corresponding to various parameters as illustrated in FIG. 9 in step 817. That is, the server controller 215 searches a management object which is suitable to the operating environment of the communication terminal 100. Here, the server controller 215 selects a speech setup object and a video setup object, and then, selects a speech adaptation object corresponding to the speech setup object and selects a video adaptation object corresponding to the video setup object. In addition, the server controller 215 determines whether the corresponding management object is stored as a candidate object in the server memory 213 in step 819.

Next, if it is determined that the corresponding management object is stored as a candidate object in the server memory 213 in step 819, the server controller 215 determines whether the corresponding management object is stored as a candidate object in the communication terminal 100 in step 821. At this time, the server memory 213 can store the record of management objects which were notified by the server controller 215 to the communication terminal 100, and the server controller 215 can recognize candidate objects which are stored in the communication terminal 100 using the record. In addition, if it is determined that the corresponding management object is stored in the communication terminal 100 in step 821, the server controller 215 transmits an identifying ID corresponding to the corresponding management object to the communication terminal in step 823. That is, the server controller 215 detects an identifying ID of a candidate object which is the same as the corresponding management object from the server memory 213, and transmits the detected identifying ID to the communication terminal 100. In addition, if it is determined that the corresponding management object is not stored in the communication terminal in step 821, the server controller 215 transmits the corresponding management object to the communication terminal 100. That is, the server controller 215 detects an identifying ID of a candidate object which is the same as the corresponding management object from the server memory 213, and transmits the detected identifying ID along with the corresponding management object to the communication terminal 100.

Further, if it is determined that the corresponding management object is not stored as a candidate object in the server memory 213 in step 819, the server controller 215 transmits a warning message like "Invalid Media Adaptation" to the communication terminal 100 in step 827.

Further, an example of managing a management object according to the operating environment of the communication terminal in the device management server was explained, but the present invention is not limited to this example. That is, it is possible to implement the present invention by directly managing the management object according to the operating environment in a communication terminal.

Figure 10:
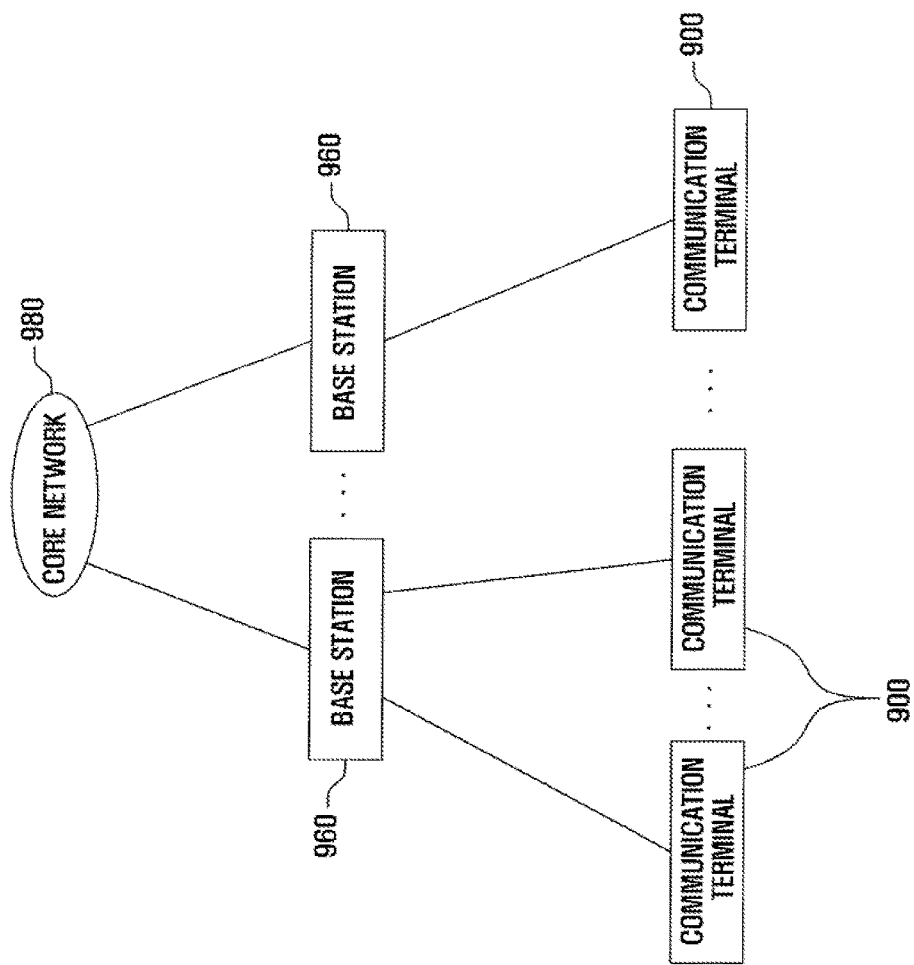
FIG. 10 illustrates a configuration of a communication system according to an exemplary embodiment of the present invention.

FIG. 10 illustrates a configuration of a communication system according to an exemplary embodiment of the present invention.

Referring to FIG. 10, a communication system of includes a communication terminal 900, a base station 960, and a core network 980. At this time, the function and internal configuration of each of the communication terminal 900, the base station 960 and the core network 980 are similar to what was explained in the above-explained exemplary embodiment, so the detailed explanation is omitted here.

However, the base station 960 recognizes the operating environment of the communication terminal 900, and notifies the communication terminal 900 of the operating environment. At this time, the base station 960 constitutes loading information including a communication load of a corresponding base station, such as remaining power of a power amplifier in a corresponding base station, and can provide the loading information as the operating environment of the communication terminal 900. In addition, the base station 960 can frequently or periodically recognize the operating environment of the communication terminal 100, and can frequently or periodically notify the communication terminal 900 of the operating environment. That is, the communication terminal 900 can recognize the operating environment through the base station 960.

Figure 11:
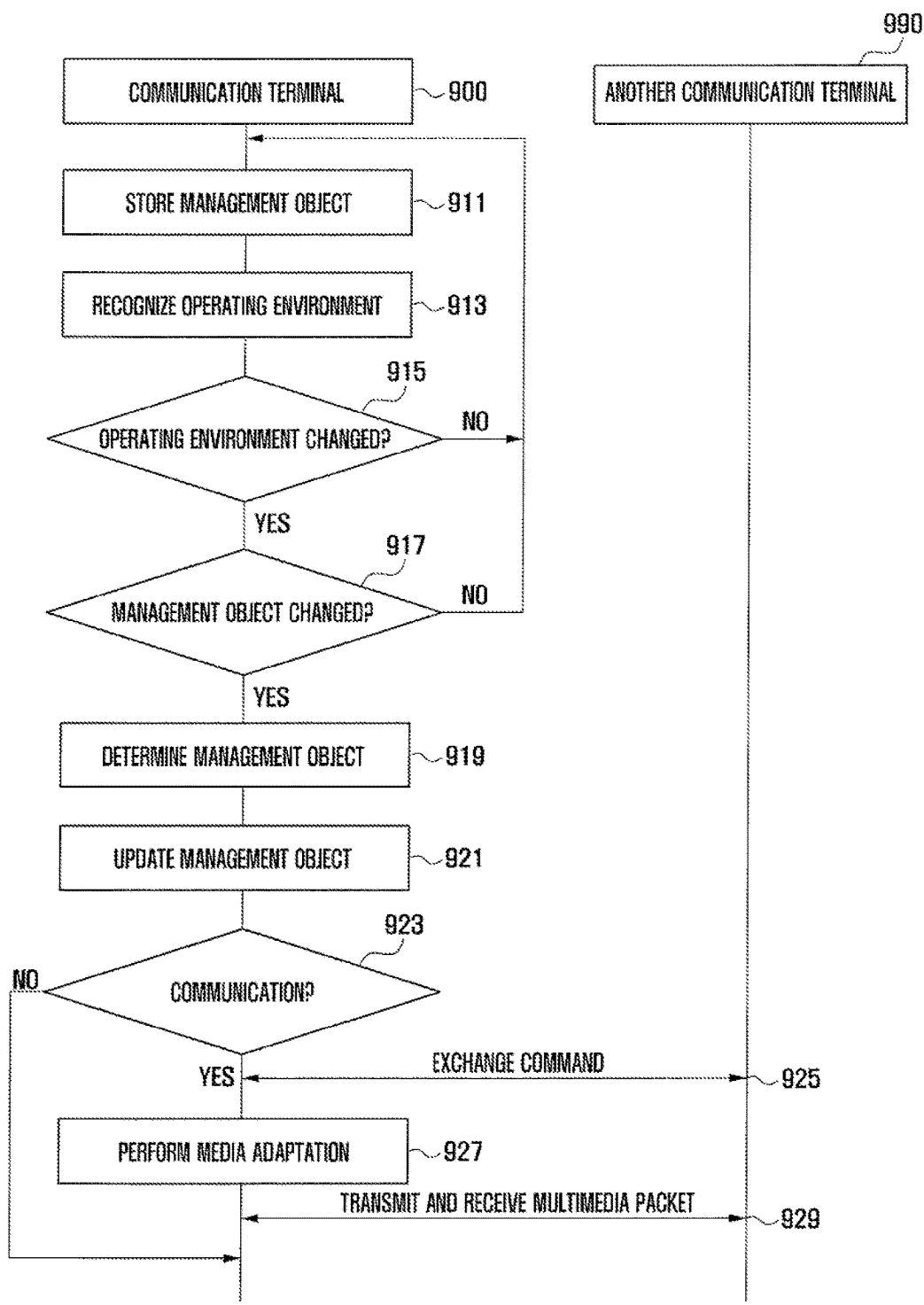
FIG. 11 illustrates a signal flow when performing a media adaptation procedure in a communication system according to an exemplary embodiment of the present invention.

FIG. 11 illustrates a signal flow when performing a media adaptation procedure in a communication system according to an exemplary embodiment of the present invention.

Referring to FIG. 11, the media adaptation procedure starts with the situation that a communication terminal 900 stores a management object in step 911. At this time, the communication terminal 900 can store the management object according to the setting at the manufacturing process. Here, the communication terminal 900 can store candidate objects for updating to the management object. In addition, the communication terminal 900 recognizes the operating environment in step 913. At this time, the communication terminal 900 can recognize the operating environment frequently or periodically at regular intervals through the base station 960. Here, the communication terminal 900 can recognize the operating environment by collecting loading information including a communication load of the base station, for example, consumed power of a power amplifier in a corresponding base station 960.

Next, if it is determined that the operating environment is changed in step 915, the communication terminal 900 determines whether it is necessary to change the management object in step 917. That is, the communication terminal 900 determines whether a management object which is suitable to the current operating environment is stored. At this time, if it is determined that a management object which is not suitable to the current operating environment is stored, and thus it is necessary to change the management object in step 915, the communication terminal 900 determines a management object according to the current operating environment in step 919. At this time, the communication terminal 900 selects one which is suitable to the current operating environment among the candidate objects. For example, if the communication load of the base station 960 is high in the current operating environment, the communication terminal 900 can select a management object assuming a relatively low bit transmission rate and a relatively high packet loss rate. In addition, if the communication load of the base station 960 is low in the current operating environment, the communication terminal 900 can select a management object assuming that a bit transmission rate is relatively high and a packet loss rate is relatively low. Here, the communication terminal 900 selects a speech setup object and a video setup object, and then, selects a speech adaptation object corresponding to the speech setup object and selects a video adaptation object corresponding to the video setup object. Thereafter, the communication terminal 900 updates the management object in step 921.

Next, when communicating with another communication terminal 990 in step 923, the communication terminal 900 exchanges a command with another communication terminal in step 925. In addition, when receiving a command, the communication terminal 900 performs media adaptation using a management object in step 927. At this time, the communication terminal 900 determines a packet unit between the communication terminal 900 and another communication terminal 990 according to the operating environment. Thereafter, the communication terminal 900 transmits and receives a multimedia packet to and from another communication terminal 990 in accordance with the packet unit in step 929.

Further, though not illustrated, the candidate objects can be updated by a company in the communication terminal 900. That is, in the communication terminal 900, some of the candidate objects can be deleted or changed, and new candidate objects can be added.

According to exemplary embodiments of the present invention, a communication terminal can adaptively perform media adaptation according to an operating environment. That is, in a communication system, a device management server provides a management object according to the operating environment of a communication terminal, so that media adaptation can be efficiently performed even though the operating environment is changed in a communication terminal. Thus, in a communication system, a multimedia packet loss of a communication terminal can be mitigated. Moreover, in a communication system, the speech or video quality of a multimedia packet can be improved, and communication load can be uniformly kept, thereby improving performance of a communication system.

While the invention has been shown and described with reference to certain exemplary embodiments thereof, it will be understood by those skilled in the art that various changes in form and details may be made therein without departing from the spirit and scope of the invention, as defined in the appended claims and their equivalents.

What is claimed is:

1. A media adaptation method of a communication terminal in a wireless communication system, the method comprising:
   storing, by the communication terminal, a plurality of management objects for a multimedia packet, the plurality of management objects including a plurality of voice management objects and a plurality of video management objects;
   selecting, by the communication terminal, one of the plurality of the voice management objects and one of the plurality of the video management objects, if media adaptation based multimedia communication is required with another communication terminal;
   generating, by the communication terminal, a multimedia packet based on the selected voice management object and the selected video management object; and
   transmitting, by the communication terminal, the generated multimedia packet to the another communication terminal,
   wherein each voice management object and each video management object includes a coding scheme and a bandwidth.

2. The media adaptation method of claim 1, wherein each voice management object and each video management object further comprises at least one of an oscillation inhibition reference value, an update period, a response restraint time to a specific request, a packet loss burst, an Explicit Congestion Notification (ECN) for a communication path, and an encoding rate.

3. The media adaptation method of claim 1, further comprising:
updating, when a new management object is received from a device management server, the stored plurality of the management objects by adding the new management object or by changing one of the stored plurality of the management objects to the new management object.

4. The media adaptation method of claim 1, further comprising:
updating a condition stored to select the one of the plurality of the voice management objects and the one of the plurality of the video management objects by changing the stored condition to a new condition when the new condition is received from a device management server.

5. The media adaptation method of claim 1, wherein the selecting, by the communication terminal, of the one of the plurality of the voice management objects and the one of the plurality of the video management objects comprises selecting one of the plurality of the voice management objects and one of the plurality of the video management objects based on an operating environment of the communication terminal.

6. The media adaptation method of claim 5, wherein the operating environment comprises a network to which the communication terminal is connected or a cell where the communication terminal is positioned.

7. The media adaptation method of claim 5, wherein the selecting, by the communication terminal, of the one of the plurality of the voice management objects and the one of the plurality of the video management objects is performed when the operating environment is changed.

8. The media adaptation method of claim 1,
wherein each voice management object and each video management object includes a basic setup object and an actual adaptation object, and
wherein at least one packet loss rate (PLR) is included in the actual adaptation object.

9. A communication terminal for a media adaptation in a communication system, the communication terminal comprising:
a memory configured to store a plurality of management objects for a multimedia packet, the plurality of management objects including a plurality of voice management objects and a plurality of video management objects;
a controller configured to select one of the plurality of the voice management objects and one of the plurality of the video management objects, if media adaptation based multimedia communication is required with another communication terminal; and
a communication unit configured to:
generate a multimedia packet based on the selected one of plurality of the voice management object and the selected one of plurality of the video management object, and
transmit the generated multimedia packet to the another communication terminal,
wherein each voice management object and each video management object includes a coding scheme and a bandwidth.

10. The communication terminal of claim 9, wherein each voice management object and each video management object further comprises at least one of an oscillation inhibition reference value, an update period, a response restraint time to a specific request, a packet loss burst, an Explicit Congestion Notification (ECN) for a communication path, and an encoding rate.

11. The communication terminal of claim 9, wherein the controller is further configured to update the stored plurality of the management objects in the memory when a new management object is received from a device management server by adding the new management object or by changing one of the stored plurality of the management objects to the new management object.

12. The communication terminal of claim 9, wherein the controller is further configured to update a condition stored in the memory to select the one of the plurality of the voice management objects and the one of the plurality of the video management objects by changing the stored condition to a new condition when the new condition is received from a device management server.

13. The communication terminal of claim 9, wherein the controller is further configured to select the one of the plurality of the voice management objects and the one of the plurality of the video management objects based on an operating environment of the communication terminal.

14. The communication terminal of claim 13, wherein the operating environment comprises a network to which the communication terminal is connected or a cell where the communication terminal is positioned.

15. The communication terminal of claim 13, wherein the controller is further configured to select the one of the plurality of the voice management objects and the one of the plurality of the video management objects when the operating environment is changed.

16. The communication terminal of claim 9,
wherein each voice management object and each video management object includes a basic setup object and an actual adaptation object, and
wherein at least one packet loss rate (PLR) is included in the actual adaptation object.

* * * * *